US012774005B2

(12) United States Patent
Arai et al.

(10) Patent No.: US 12,774,005 B2
(45) Date of Patent: Oct. 27, 2026

(54) CONTROL DEVICE FOR VEHICLE

(71) Applicant: TOYOTA JIDOSHA KABUSHIKI KAISHA, Toyota (JP)

(72) Inventors: Shotaro Arai, Okazaki (JP); Shunsuke Oyama, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 18/979,659

(22) Filed: Dec. 13, 2024

(65) Prior Publication Data

US 2025/0282368 A1 Sep. 11, 2025

(30) Foreign Application Priority Data

Mar. 8, 2024 (JP) ................................ 2024-036318

(51) Int. Cl.

*B60W 10/00* (2006.01)
*B60W 10/08* (2006.01)
*B60W 10/10* (2012.01)
*B60W 50/08* (2020.01)
*B60W 50/10* (2012.01)

(52) U.S. Cl.

CPC .......... *B60W 50/085* (2013.01); *B60W 10/08* (2013.01); *B60W 10/10* (2013.01); *B60W 50/10* (2013.01); *B60W 2540/10* (2013.01)

(58) Field of Classification Search

CPC .... B60W 10/00; B60W 10/10; B60W 50/085; B60W 50/10; B60W 2540/10

See application file for complete search history.

(56) References Cited

U.S. PATENT DOCUMENTS

| | | | | |
|---|---|---|---|---|
| 6,459,980 B1 * | 10/2002 | Tabata | .................... | B60L 50/16 180/65.245 |
| 6,719,076 B1 * | 4/2004 | Tabata | .................... | B60L 50/61 903/910 |
| 2013/0317718 A1 * | 11/2013 | Sato | ...................... | F02D 11/105 701/1 |
| 2016/0252180 A1 * | 9/2016 | Sato | .................. | F16H 61/66259 701/51 |
| 2017/0327095 A1 * | 11/2017 | Leitermann | ............. | B60T 8/171 |

FOREIGN PATENT DOCUMENTS

JP 2009-137384 A 6/2009

* cited by examiner

*Primary Examiner* — Tan Q Nguyen
(74) *Attorney, Agent, or Firm* — SoraIP, Inc.

(57) ABSTRACT

The larger the amount of change in the accelerator operation amount from the point in time when the accelerator returning operation is performed to the current point in time, the larger the reduction rate of the driving torque at the time of decreasing toward the required value of the driving torque is set. When the amount of change in the accelerator operation amount is relatively great, the reduction rate of the driving torque is set to a relatively great value in accordance with the scene in which prioritizing responsiveness is likely to be desired, such that the driving torque is quickly reduced. When the amount of change in the accelerator operation amount is relatively small, the reduction rate of the driving torque is set to a relatively small value in accordance with the scene in which prioritizing controllability is likely to be desired, so the driving torque is gradually reduced.

3 Claims, 3 Drawing Sheets

CONTROL DEVICE FOR VEHICLE

CROSS-REFERENCE TO RELATED APPLICATION

This application claims priority to Japanese Patent Application No. 2024-036318 filed on Mar. 8, 2024, incorporated herein by reference in its entirety.

BACKGROUND

1. Technical Field

The disclosure relates to a control device for a vehicle that sets a reduction rate of a driving torque when reducing the driving torque toward a requested value.

2. Description of Related Art

A control device for a vehicle including a power source and a power transmission device that transmits power from the power source to drive wheels is well known. An example thereof is a vehicle described in Japanese Unexamined Patent Application Publication No. 2009-137384 (JP 2009-137384 A). This JP 2009-137384 A discloses that when transitioning from a state in which an accelerator is depressed to a state in which the accelerator is not depressed, there is a tendency for increase in accordance with increase in allowance electric power currently charging a battery up to an input limit, regarding which a reduction rate for driving torque is set so as to be reduced toward a requested driving torque.

SUMMARY

Now, difference in accelerator operation amount at a point in time of an accelerator returning operation, or difference in accelerator operation amount at a current point in time after the accelerator returning operation, may be difference in accordance with whether the situation is a scene in which prioritizing responsiveness is desired or a scene in which prioritizing controllability is desired. The accelerator returning operation is an accelerator operation state that changes from an increased state to a reduced state. Responsiveness is a deceleration characteristic that rapidly reduces driving torque in response to the accelerator returning operation. Controllability is a deceleration characteristic that gradually reduces the driving torque in response to the accelerator returning operation. Incidentally, in the technology described in JP 2009-137384 A, when the accelerator returning operation is performed, the reduction rate of the driving torque is set in accordance with the input limit of the battery, and a uniform reduction rate of the driving torque is set regardless of the difference in the accelerator operation amount. Accordingly, when the reduction rate of the driving torque is set so as to correspond to a scene in which prioritizing responsiveness is desired, controllability may deteriorate. Alternatively, when the reduction rate of the driving torque is set so as to correspond to a scene in which prioritizing controllability is desired, responsiveness may deteriorate.

The disclosure has been made in view of the above circumstances, and an object thereof is to provide a control device for a vehicle that is capable of setting a reduction rate of driving torque by differentiating scenes in accordance with responsiveness and controllability.

An essence of a first aspect of the disclosure is (a) control device for a vehicle that is equipped with a power source and a power transmission device for transmitting power from the power source to a drive wheel, the control device including (b) a drive control unit that, the greater an amount of change in an accelerator operation amount from a point in time at which an accelerator returning operation was performed to a current point in time is, sets a reduction rate of driving torque to a greater value, when reducing the driving torque toward a requested value of the driving torque based on a current value of the accelerator operation amount. The accelerator returning operation is an operation in which an accelerator operation state changes from an increased state to a reduced state.

According to the first aspect of the disclosure, the greater the amount of change in the accelerator operation amount from the point in time when the accelerator returning operation is performed, to the current point in time, the greater the value to which the reduction rate of the driving torque when being reduced toward the requested value of the driving torque is set to be. As a result, when the amount of change in the accelerator operation amount is relatively great, the reduction rate of the driving torque is set to a relatively great value in accordance with the scene in which prioritizing responsiveness is likely to be desired, such that the driving torque is quickly reduced. On the other hand, when the amount of change in the accelerator operation amount is relatively small, the reduction rate of the driving torque is set to a relatively small value in accordance with the scene in which prioritizing controllability is likely to be desired, such that the driving torque is gradually reduced. Accordingly, the reduction rate of the driving torque can be set by differentiating scenes in accordance with responsiveness and controllability.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, examples of the present disclosure will be described in detail with reference to the drawings.

Figure 1:
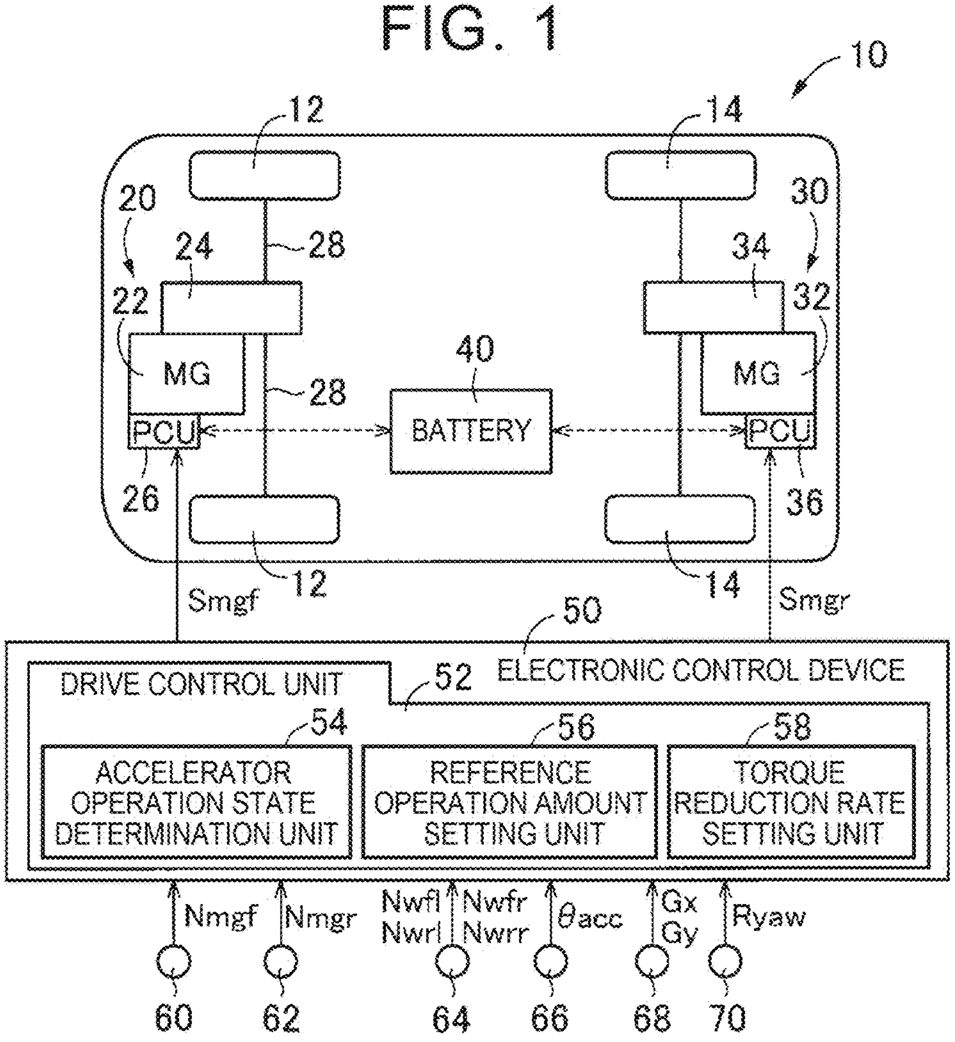
FIG. 1 is a diagram for explaining a schematic configuration of a vehicle to which the present disclosure is applied, and is a diagram for explaining a control function for various kinds of control in a vehicle and a main part of a control system.

FIG. 1 is a diagram illustrating a schematic configuration of a vehicle 10 to which the present disclosure is applied, and is a diagram illustrating control functions and a main part of a control system for various controls in the vehicle 10. In FIG. 1, the vehicle 10 includes left and right front wheels 12, a front wheel drive device 20 that drives the front wheels 12, left and right rear wheels 14, and a rear wheel drive device 30 that drives the rear wheels 14 separately from each other. Further, the vehicle 10 includes a battery 40 or the like that is a chargeable/dischargeable DC power source. Note that the "left and right" is the left and right with respect to the forward direction of the vehicle 10.

The vehicle 10 is an all-wheel drive vehicle capable of adjusting the driving torque distribution of the front wheels 12 and the rear wheels 14. The vehicle 10 is a vehicle including two wheels each including a front wheel 12 and a rear wheel 14 and including four wheels, and thus is also a four-wheel drive vehicle. In the present embodiment, all-wheel drive (=AWD) and four-wheel drive (=4WD) have the same meaning. In addition to traveling in 4WD control (4WD state is also synonymous) in which the driving torque is distributed to four wheels, the vehicle 10 can also travel in two-wheel drive (=2WD) control (2WD state is also synonymous) in which the driving torque is distributed only to one of the front wheels 12 and the rear wheels 14. The front wheels 12 and the rear wheels 14 are drive wheels of the vehicle 10.

The front wheel drive device 20 includes a front motor 22, a front wheel power transmission device 24, and a front wheel PCU (Power Control Unit) 26. The rear wheel drive device 30 includes a rear motor 32, a rear wheel power transmission device 34, and a rear wheel PCU 36. The front motor 22 and the rear motor 32 each function as a power source of the vehicle 10. The front wheel power transmission device 24 is a power transmission device that transmits power from the front motor 22 to the front wheel 12. The rear wheel power transmission device 34 is a power transmission device that transmits power from the rear motor 32 to the rear wheel 14. The front wheel PCU 26 controls the front motor 22. The rear wheel PCU 36 controls the rear motor 32.

The front motor 22 is a known rotary electric machine, a so-called motor generator, and is connected to the battery 40 via a front wheel PCU 26. The front wheel power transmission device 24 includes a reduction gear mechanism including a differential gear (not shown) connected to the front motor 22, a pair of front drive shafts 28 connected to the reduction gear mechanism, and the like. The front wheel PCU 26 includes, for example, inverters, and converts DC power from the battery 40 into AC power and supplies the AC power to the front motor 22. Further, the front wheel PCU 26 converts AC power generated by the front motor 22 by, for example, regenerative braking into DC power and supplies the DC power to the battery 40. The front wheel PCU 26 is a power control device that controls electric power exchanged between the battery 40 and the front motor 22.

The rear motor 32, the rear wheel power transmission device 34, and the rear wheel PCU 36 each have the same functions as those of the front motor 22, the front wheel power transmission device 24, and the front wheel PCU 26, and their explanations are omitted.

The vehicle 10 is a vehicle capable of independently controlling the variation of the driving torque of the front and rear wheels, and is a front and rear wheel independent driving type battery electric vehicle, that is, a BEV (Battery Electric Vehicle). In the present embodiment, when the front wheel drive device 20 and the rear wheel drive device 30 are not particularly distinguished from each other, the drive device PU is represented. When the front motor 22 and the rear motor 32 are not particularly distinguished from each other, they are referred to as motor MG. When the front wheel power transmission device 24 and the rear wheel power transmission device 34 are not particularly distinguished from each other, they are referred to as a power transmission device PT.

The vehicle 10 further includes an electronic control device 50 as a controller including a control device for the vehicle 10 related to various controls such as driving torque control for the front and rear wheels. The electronic control device 50 includes, for example, a so-called microcomputer including a CPU, RAM, ROM, an input/output interface, and the like. CPU performs various kinds of control of the vehicles 10 by performing signal-processing in accordance with a program stored in ROM in advance while using a temporary storage function of RAM.

Various signals based on detection values by various sensors provided in the vehicle 10 are supplied to the electronic control device 50. Examples of the various sensors include a MGF rotation sensor 60, a MGR rotation sensor 62, wheel speed sensors 64, an accelerator operation amount sensor 66, a G sensor 68, and a yaw rate sensor 70. The various types of signals include, for example, a MGF rotational speed Nmgf, MGR rotational speed Nmgr, left and right front wheel rotational speeds Nwfl, Nwfr, left and right rear wheel rotational speeds Nwrl, Nwrr, an accelerator operation amount θacc, a front-rear acceleration Gx, a left-right acceleration Gy, a yaw rate Ryaw, and the like. The electronic control device 50 acquires the vehicle speed V based on the front wheel rotational speed Nwfl, Nwfr and the rear wheel rotational speed Nwrl, Nwrr. For example, the electronic control device 50 acquires the vehicle speed V from the average value of the front wheel rotational speed Nwfl, Nwfr and the rear wheel rotational speed Nwrl, Nwrr, the average value of the front wheel rotational speed Nwfl, Nwfr, the average value of the rear wheel rotational speed Nwrl, Nwrr, or the like.

MGF rotational speed Nmgf is the rotational speed of the front motor 22. MGR rotational speed Nmgr is the rotational speed of the rear motor 32. The front wheel rotational speed Nwfl, Nwfr is the rotational speed of the front wheel 12. The rear wheel rotational speed Nwrl, Nwrr is the rotational speed of the rear wheel 14. The accelerator operation amount θacc is a signal indicating a magnitude of an acceleration operation of the driver (=driver), and is an accelerator operation amount of the driver. The front-rear acceleration Gx is a longitudinal acceleration of the vehicle 10. The left-right acceleration Gy is an acceleration of the vehicle 10 in the left-right direction. The yaw rate Ryaw is a rotational angular velocity around the vertical axis of the vehicle 10.

Various command signals are output from the electronic control device 50 to each device provided in the vehicle 10. The devices are, for example, a front wheel PCU 26, a rear wheel PCU 36, and the like. The various command signals are, for example, a MGF control command signal Smgf, MGR control command signal Smgr. MGF control command Smgf is a torque command for controlling MGF torque Tmgf which is the torque of the front motor 22. MGR control command Smgr is a torque command for controlling MGR torque Tmgr which is the torque of the rear motor 32.

The electronic control device 50 includes a drive control unit 52 for realizing various kinds of control in the vehicle 10.

The drive control unit 52 controls the drive device PU. For example, the drive control unit 52 calculates a drive request amount for the vehicle 10 by the driver by applying the accelerator operation amount θacc and the vehicle speed V to the drive request amount map. The drive request amount map is a relationship for determining a drive request amount that is determined and stored in advance experimentally or by design, that is, predetermined. For example, a required driving torque Twdem as a requested value of a driving torque Tw which is a torque in the wheels (the front wheels 12 and the rear wheels 14) is used as the drive required amount. The drive control unit 52 performs drive control for controlling the motor MG so as to realize the required driving torque Twdem in view of the transmission efficiency of the power transmission device PT and the like. The torque and the force (driving force) are synonymous with each other unless otherwise distinguished. The accelerator operation amount θacc is synonymous with the current accelerator operation amount θaccr, which is the current value of the accelerator operation amount θacc, unless otherwise specified.

The driving torque Tw is a combination of the front torque Twf which is the torque in the front wheel 12 and the rear torque Twr which is the torque in the rear wheel 14. The required driving torque Twdem is a value obtained by combining the required front torque Twfdem as the requested value of the front torque Twf and the required rear torque Twrdem as the requested value of the rear torque Twr. The drive control unit 52 sets the torque distribution ratio γfr of the front and rear wheels by applying a plurality of driving force-related values such as the accelerator operation amount θacc, the vehicle speed V, the front-rear acceleration Gx, and the yaw rate Ryaw to the torque distribution ratio map, for example. The torque distribution ratio map is a relationship for obtaining a torque distribution ratio γfr based on a predetermined traveling state. The drive control unit 52 calculates the required front torque Twfdem and the required rear torque Twrdem based on the required driving torque Twdem and the torque distribution ratio γfr. The drive control unit 52 outputs a MGF control command Smgf for controlling the front motor 22 so as to realize the required front torque Twfdem to the front wheel PCU 26. The drive control unit 52 outputs a MGR control command Smgr for controlling the rear motor 32 so as to realize the required rear torque Twrdem to the rear wheel PCU 36.

Here, when an accelerator returning operation in which the accelerator operation state changes from the increase state to the decrease state is performed by the driver, the drive control unit 52 sets a torque reduction rate Rdt for decreasing the accelerator operation state toward the required driving torque Twdem. The torque reduction rate Rdt is a reduction rate of the driving torque Tw. When the accelerator returning operation is performed, the drive control unit 52 reduces the driving torque Tw by the torque reduction rate Rdt. The drive control unit 52 sets, for the required front torque Twfdem, a torque reduction rate Rdt on the front wheel 12 side (the front side is also synonymous), that is, a front torque reduction rate Rdtf which is a reduction rate of the front torque Twf. The drive control unit 52 sets, for the required rear torque Twrdem, a rear torque reduction rate Rdtr which is a torque reduction rate Rdt on the rear wheel 14 side (also synonymous with the rear side), that is, a reduction rate of the rear torque Twr. When the accelerator returning operation is performed, the drive control unit 52 reduces the front torque Twf by the front torque reduction rate Rdtf and reduces the rear torque Twr by the rear torque reduction rate Rdtr. Increasing the accelerator operation state is a state in which the accelerator operation amount θacc is increased or a state in which the accelerator operation amount θacc is maintained at a value after the increase or in the vicinity of the value. The reduced state of the accelerator operation state is a state in which the accelerator operation amount θacc is lowered or a state in which the accelerator operation amount θacc is maintained at a value after the lowering or in the vicinity of the value. In the accelerator operation state and the accelerator operation amount θacc, the increase and the increase are synonymous with each other, and the decrease and the decrease are synonymous with each other. The torque reduction rate Rdt is expressed by an absolute value for convenience, and the larger the value, the more the driving torque Tw tends to decrease.

Incidentally, for example, when the torque reduction rate Rdt is set according to the present accelerator operation amount θaccr, the torque reduction rate Rdt corresponding to the accelerator operation amount θacc prior to the accelerator returning operation is not set. For example, the torque reduction rate Rdt is set to be the same when the accelerator operation amount θacc is from the high opening degree and when the accelerator operation amount θacc is from the low opening degree. On the other hand, a scene of an accelerator returning operation in which the accelerator operation amount θacc is changed from a high opening degree to a steady travel equivalent is a scene in which responsiveness is desired to be emphasized. Alternatively, a scene of the accelerator returning operation in which the accelerator operation amount θacc is changed from the low opening degree to the steady travel equivalent is a scene in which the controllability is desired to be emphasized. When the torque reduction rate Rdt is set uniformly in accordance with the accelerator operation amount θaccr at present, it is not possible to separate a scene in which responsiveness is desired to be emphasized and a scene in which controllability is desired to be emphasized. Therefore, when the torque reduction rate Rdt is set on the basis of the accelerator returning operation in which the accelerator operation amount θacc is changed from the high opening degree to the steady travel equivalent, a relatively large torque reduction rate Rdt is set regardless of the accelerator operation amount θacc prior to the accelerator returning operation. In this case, when an accelerator returning operation is performed in which the accelerator operation amount θacc is changed from the low opening degree to the steady travel equivalent, the controllability may deteriorate. Alternatively, when the torque reduction rate Rdt is set on the basis of the accelerator returning operation in which the accelerator operation amount θacc is changed from the low opening degree to the steady travel equivalent, a relatively small torque reduction rate Rdt is set regardless of the accelerator operation amount θacc prior to the accelerator returning operation. In this case, there is a possibility that the responsiveness deteriorates when an accelerator returning operation is performed in which the accelerator operation amount θacc is changed from the high opening degree to the steady travel equivalent.

The above-described problem that it is impossible to separate a scene in which responsiveness is desired to be emphasized from a scene in which controllability is desired to be emphasized may occur even when the torque reduction rate Rdt is uniformly set in accordance with the accelerator operation amount θacc prior to the accelerator returning operation. For example, the above-described problem may occur even when the torque reduction rate Rdt is set to the same value in a case where the accelerator returning operation performed from the accelerator operation amount θacc having the same value is the current accelerator operation amount θaccr to the high opening degree and the low opening degree.

Therefore, the drive control unit 52 sets the torque reduction rate Rdt at the time of decreasing toward the required driving torque Twdem to a larger value as the variation of the accelerator operation amount θacc from the point in time when the accelerator returning operation is performed to the current point in time is larger. The amount of change in the accelerator operation amount θacc from the point in time when the accelerator returning operation is performed to the current point in time is the difference between the accelerator operation amount θacc at the point in time when the accelerator returning operation is performed and the current accelerator operation amount θaccr.

For example, the drive control unit 52 sets the torque reduction rate Rdt to a larger value as compared with a case where the accelerator operation amount θacc is made from a smaller value when the accelerator operation amount θacc is made from a larger value when the accelerator returning operation to the present accelerator operation amount θaccr of the same value is made from a larger value. And/or, when the accelerator returning operation performed from the accelerator operation amount θacc having the same value is the accelerator operation amount θacc having the same value and the accelerator operation amount θaccr having the smaller value, the drive control unit 52 sets the torque reduction rate Rdt to a larger value as compared with the case of the accelerator operation amount θaccr having the larger value.

The drive control unit 52 includes, for example, an accelerator operation state determination unit 54, a reference operation amount setting unit 56, and a torque reduction rate setting unit 58 in order to set a torque reduction rate Rdt by dividing a scene by responsiveness and controllability.

Figure 2:
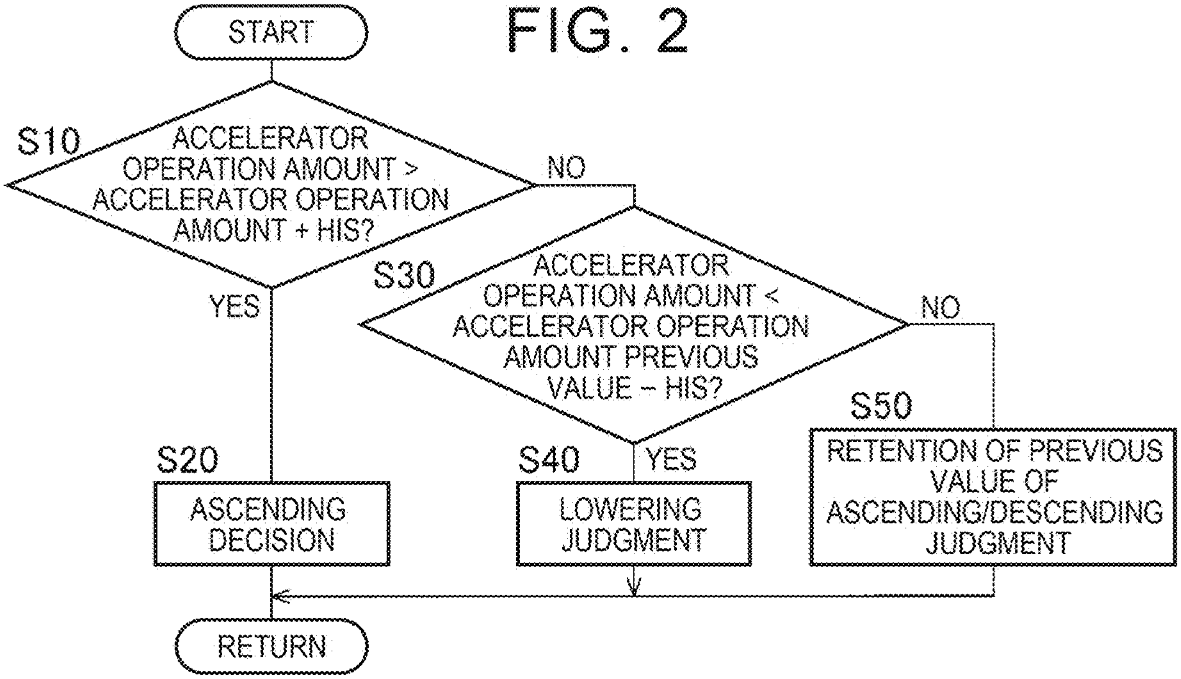
FIG. 2 is a flowchart for explaining a main part of a control operation of the electronic control device, and is a flowchart for explaining a control operation for determining whether an accelerator operation state is an ascending state or a descending state.

FIG. 2 is a flowchart for explaining a main part of the control operation of the electronic control device 50, and is a flowchart for explaining a control operation for determining whether the accelerator operation state is an ascending state or a descending state, and is repeatedly executed, for example.

In FIG. 2, each step of the flowchart corresponds to the function of the accelerator operation state determination unit 54. In S10 of the step (hereinafter, the step is omitted), it is determined whether or not the accelerator operation amount θaccr is larger than the value obtained by adding the predetermined increase opening degree to the previous value of the accelerator operation amount θacc. The previous value of the accelerator operation amount θacc is, for example, a value before a predetermined cycle or a value before a predetermined time in the flowchart. The predetermined ascending opening degree is, for example, a predetermined hysteresis equivalent amount for determining that the accelerator operation amount θacc is ascending. When the determination of S10 is affirmative, it is determined in S20 that the accelerator operating condition is elevated. If the determination of S10 is negative, it is determined in S30 whether or not the present accelerator operation amount θaccr is smaller than a value obtained by subtracting the predetermined lowering opening degree from the previous value of the accelerator operation amount θacc. The predetermined descent opening degree is, for example, a predetermined hysteresis equivalent amount for determining that the accelerator operation amount θacc is descending. When the determination of S30 is affirmative, it is determined in S40 that the accelerator operating condition is lowered. When the determination of S30 is negative, the previous value of the ascent determination or the descent determination is held in S50. This previous value is a value one cycle before the flowchart.

Figure 3:
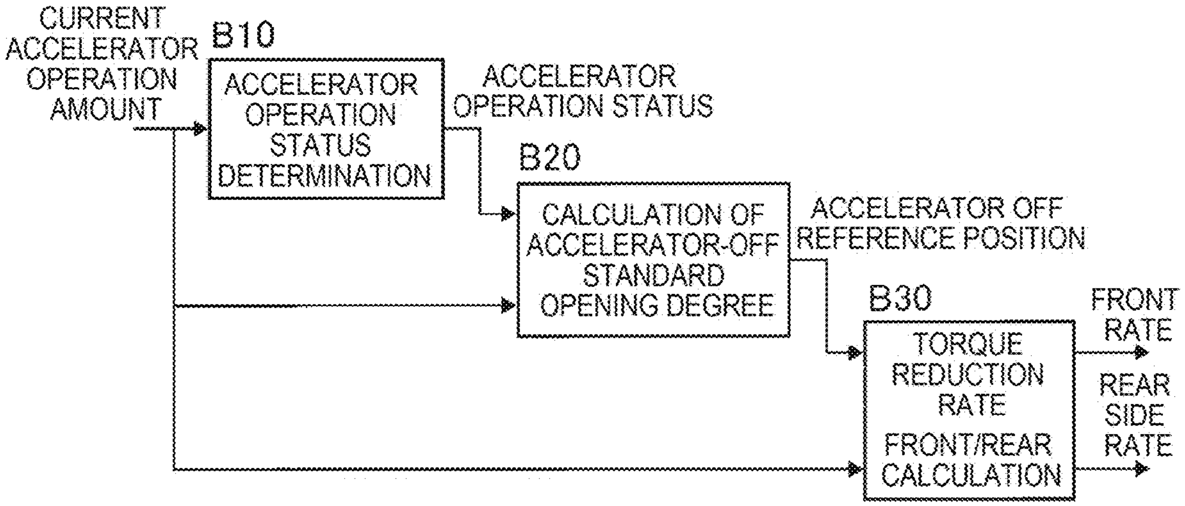
FIG. 3 is a diagram for explaining an example of a functional block for setting a torque reduction rate by dividing a scene by responsiveness and controllability.

FIG. 3 is a diagram for explaining an exemplary functional block for setting a torque-reduction-rate Rdt by dividing a scene by responsiveness and controllability. In FIG. 3, the blocking B10 corresponds to the function of the accelerator operation state determination unit 54. The blocking B20 corresponds to the function of the reference operation amount setting unit 56. The blocking B30 corresponds to the function of the torque reduction rate setting unit 58.

In the blocking B10, the accelerator operating condition is determined based on the present accelerator operation amount θaccr. For example, based on the current accelerator operation amount θaccr, it is determined whether the accelerator operation state is an increase or a decrease (see FIG. 2). In addition, it is determined whether or not an accelerator returning operation has been performed based on whether or not the accelerator operation state has changed from ascending to descending. In this way, the accelerator operation state determination unit 54 determines whether or not an accelerator returning operation has been performed.

In the blocking B20, the accelerator-off reference opening degree θaccb is calculated based on the accelerator operation amount θaccr and the accelerator operating condition. The accelerator off reference opening degree θaccb is an accelerator operation amount θacc that is a reference when the amount of change in the accelerator operation amount θacc from the point in time when the accelerator returning operation is performed to the current point in time is obtained, that is, a reference operation amount. For example, when the determination that the accelerator returning operation has been performed is not input, the current accelerator-off reference opening degree θaccb is held. When the determination that the accelerator returning operation has been performed is input, the accelerator-off reference opening degree θaccb is updated to the value of the current accelerator operation amount θaccr at that time. As described above, the reference operation amount setting unit 56 sets the accelerator operation amount θacc at the point in time when the accelerator returning operation is performed as the accelerator off reference opening degree θaccb.

In the blocking B30, the torque-reduction-rate Rdt is calculated based on the accelerator operation amount θaccr and the accelerator-off reference opening θaccb. The front torque reduction rate Rdtf and the rear torque reduction rate Rdtr are respectively calculated so that the driving torque Tw is reduced by the calculated torque reduction rate Rdt. For example, the torque reduction rate Rdt is set by applying the present accelerator operation amount θaccr and the accelerator-off reference opening degree θaccb to the torque reduction rate map. The torque reduction rate map is a relation for determining a torque reduction rate Rdt based on a predetermined accelerator operating condition. In the torque reduction rate map, for example, a larger torque reduction rate Rdt is set as the reference opening degree difference Δθaccb (=θaccb−θaccr), which is a difference between the accelerator-off reference opening degree θaccb and the current accelerator operation amount θaccr, is larger. For example, when the present accelerator operation amount θaccr is the same value, a torque reduction rate Rdt having a larger value is set as compared with a value in which the accelerator-off reference opening degree θaccb is larger. When the accelerator-off reference opening degree θaccb is the same value, a torque reduction rate Rdt having a larger value is set as compared with a value in which the accelerator operation amount θaccr is smaller.

As described above, the torque reduction rate setting unit 58 sets the torque reduction rate Rdt to a larger value as the reference opening degree difference Δθaccb is larger. For example, the torque reduction rate setting unit 58 sets the torque reduction rate Rdt to a larger value when the accelerator-off reference opening degree θaccb is a larger value than the current accelerator operation amount θaccr when the accelerator-off reference opening degree θaccb is a larger value than when the accelerator-off reference opening degree θaccb is a smaller value. When the current accelerator operation amount θaccr is a smaller value than the accelerator off reference opening degree θaccb, the torque reduction rate setting unit 58 sets the torque reduction rate Rdt to a larger value than when the current accelerator operation amount θaccr is a larger value.

Figure 4:
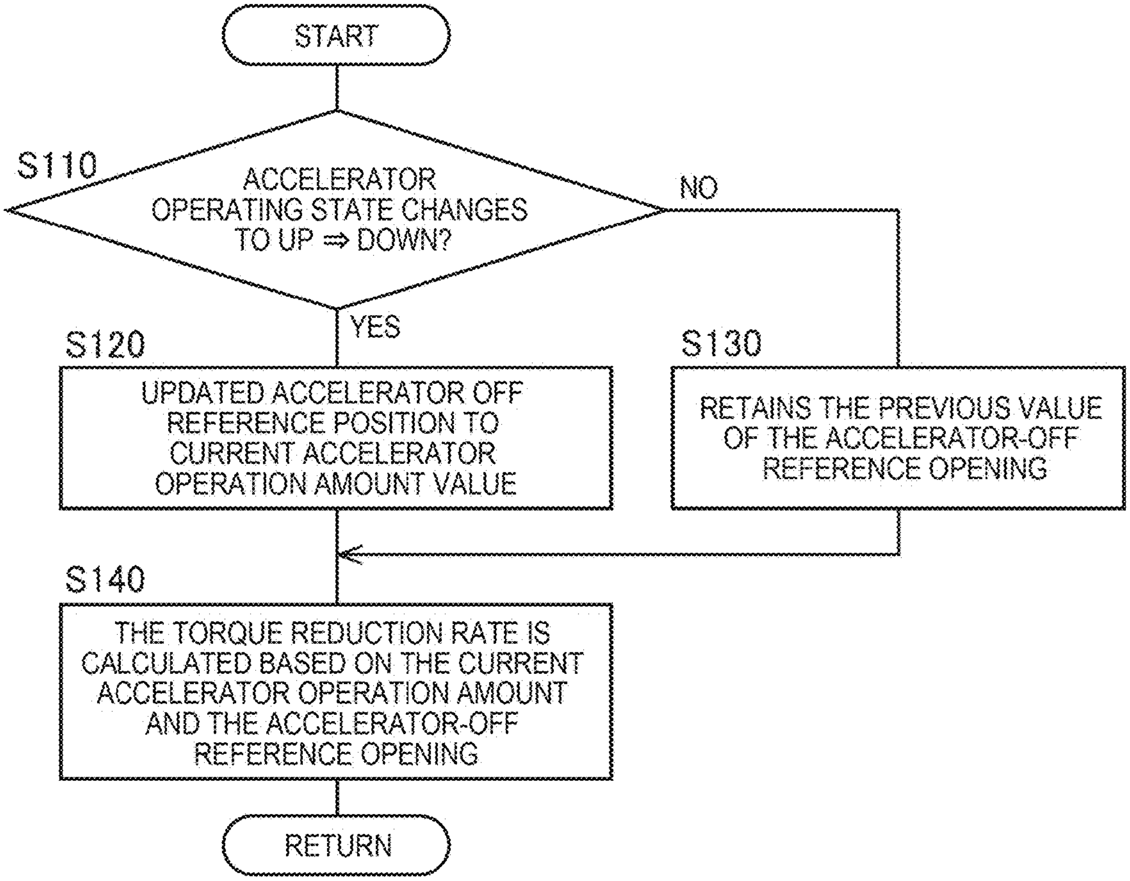
FIG. 4 is a flow chart describing a main part of a control operation of the electronic control device, and is a flow chart describing a control operation for setting a torque reduction rate by dividing a scene by responsiveness and controllability.

FIG. 4 is a flow chart for describing a main part of the control operation of the electronic control device 50, and is a flow chart for describing a control operation for setting a torque-reduction-rate Rdt by dividing a scene by responsiveness and controllability, and is repeatedly executed, for example.

In FIG. 4, first, in S110 corresponding to the function of the accelerator operation state determination unit 54, it is determined whether or not the accelerator operation state has changed from ascending to descending. When the determination of S110 is affirmative, the accelerator-off reference opening degree θaccb is updated to the present accelerator operation amount θaccr in S120 corresponding to the function of the reference operation amount setting unit 56. When the determination of S110 is negative, the previous value of the accelerator-off reference opening degree θaccb is held in S130 corresponding to the function of the reference operation amount setting unit 56. This previous value is a value one cycle before the flowchart. After S120 or S130, the torque reduction rate Rdt is calculated based on the current accelerator operation amount θaccr and the accelerator-off reference opening θaccb in S140 corresponding to the function of the torque reduction rate setting unit 58. S110 corresponds to the blocking B10 of FIG. 3. S120 and S130 correspond to the blocking B20 of FIG. 3. S140 corresponds to the blocking B30 of FIG. 3.

Figure 5:
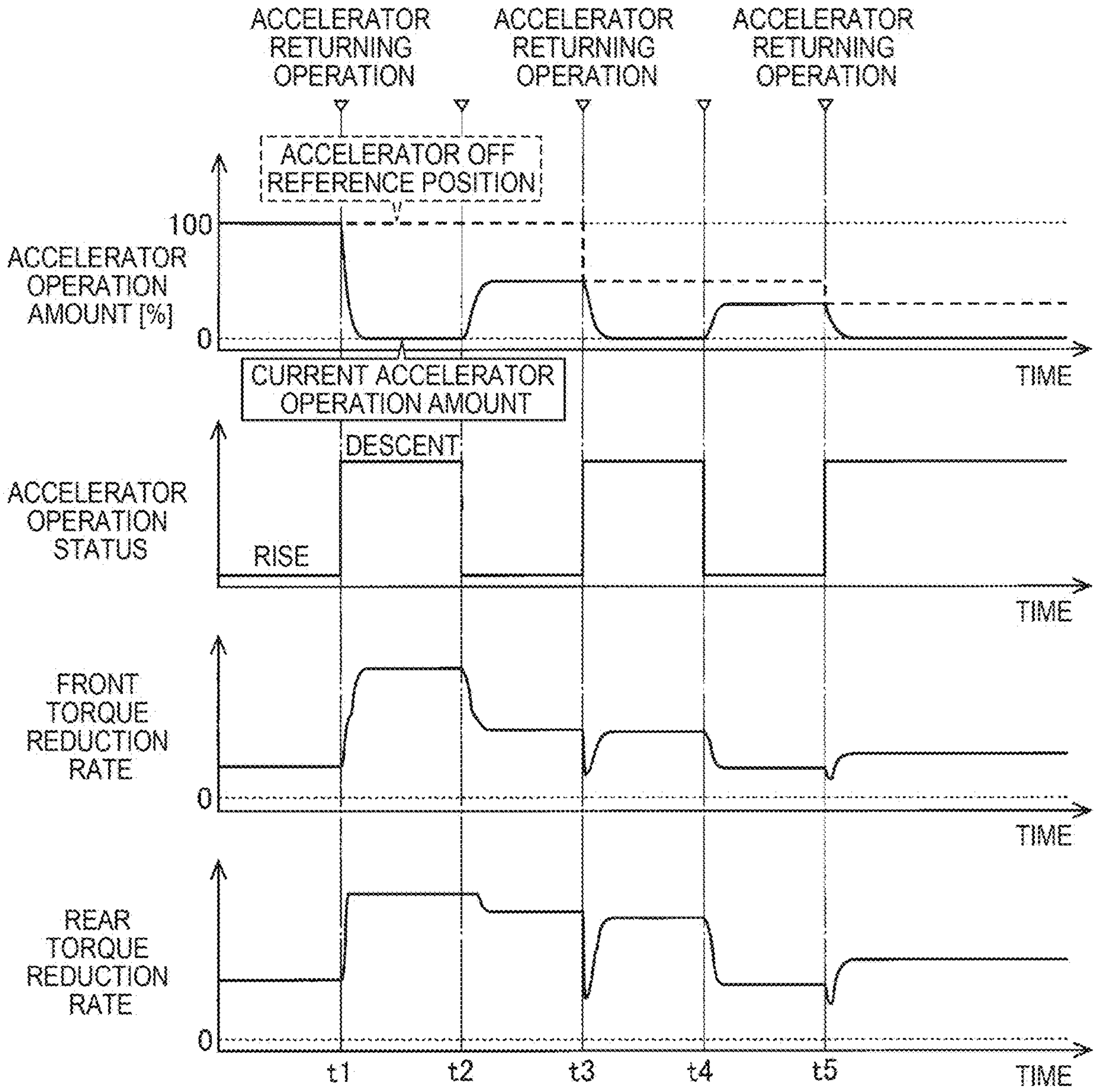
FIG. 5 is a diagram illustrating an example of a time chart when the control operation illustrated in the flowchart of FIG. 4 is executed.

FIG. 5 is a diagram illustrating an example of a time chart when the control operation illustrated in the flowchart of FIG. 4 is executed. In FIG. 5, t1 point in time indicates a point in time at which it is determined that the accelerator operation state has changed from ascending to descending due to the accelerator being turned off from the accelerator fully opened state, that is, a point in time at which it is determined that the accelerator returning operation has been performed. Then, the present accelerator operation amount θaccr at t1 point in time is set to the accelerator-off reference opening θaccb. As the accelerator operation amount θaccr is reduced from t1 point in time, the reference opening degree difference Δθaccb is increased, and the front torque reduction rate Rdtf and the rear torque reduction rate Rdtr are respectively increased (refer to t1 point in time to t2 point in time). When the accelerator is turned on at t2 point in time, the accelerator operating condition is changed to an elevated state (refer to t2 point in time to t3 point in time). After that, it is determined that the accelerator is turned off again at t3 point in time, and thus the accelerator returning operation is performed, and the accelerator-off reference opening degree θaccb is updated to the present accelerator operation amount θaccr at t3 point in time. Thereafter, similarly, at t4 point in time, the accelerator operation status is changed to an elevated state, and at t5 point in time, it is determined that the accelerator returning operation has been performed, and the accelerator-off reference opening degree θaccb is updated to the present accelerator operation amount θaccr. For convenience, the front torque reduction rate Rdtf and the rear torque reduction rate Rdtr are also calculated while the accelerator operating condition is determined to be increased. However, the torque reduction rate Rdt is not reflected in the drive control of the vehicle 10 during the period in which the accelerator operating state is determined to be increased.

As described above, according to the present embodiment, as the variation of the accelerator operation amount θacc from the point in time when the accelerator returning operation is performed to the present point in time is larger, the torque reduction rate Rdt when the accelerator operation amount acc is decreased toward the required driving torque Twdem is set to be larger. As a result, when the variation of the accelerator operation amount θacc is relatively large, the torque reduction rate Rdt is set to a relatively large value in contrast to the situation in which responsiveness is desired to be emphasized, and thus the driving torque Tw is quickly reduced. On the other hand, when the amount of change in the accelerator operation amount θacc is relatively small, the torque reduction rate Rdt is set to a relatively small value in contrast to a situation in which controllability is desired to be emphasized, so that the driving torque Tw is gradually reduced. Therefore, the torque reduction rate Rdt can be set by dividing the scene into responsiveness and controllability.

Further, according to the present embodiment, it is determined whether or not an accelerator returning operation has been performed. The accelerator operation amount θacc at the point in time when the accelerator returning operation is performed is set as the accelerator-off reference opening degree θaccb. The larger the reference opening degree difference Δθaccb (=θaccb−θaccr) is, the larger the torque reduction rate Rdt is set. Accordingly, the torque-reduction-rate Rdt can be appropriately set by dividing the scene into responsiveness and controllability.

Further, according to the present embodiment, when the accelerator-off reference opening degree θaccb is a large value with respect to the current accelerator operation amount θaccr, the torque reduction rate Rdt is set to a larger value than when the accelerator-off reference opening degree θaccb is a small value. Accordingly, when the reference opening degree difference Δθaccb is relatively large, the torque reduction rate Rdt is appropriately set to a relatively large value. On the other hand, when the reference opening degree difference Δθaccb is relatively small, the torque reduction rate Rdt is appropriately set to a relatively small value.

Further, according to the present embodiment, when the current accelerator operation amount θaccr is a smaller value than the accelerator off reference opening degree θaccb, the torque reduction rate Rdt is set to a larger value than when the current accelerator operation amount θaccr is a larger value. Accordingly, when the reference opening degree difference Δθaccb is relatively large, the torque reduction rate Rdt is appropriately set to a relatively large value. On the other hand, when the reference opening degree difference Δθaccb is relatively small, the torque reduction rate Rdt is appropriately set to a relatively small value.

Further, according to the present embodiment, when the accelerator returning operation to the present accelerator operation amount θaccr having the same value is performed from a value having a large accelerator operation amount θacc, the torque reduction rate Rdt is set to a value larger than that in the case where the accelerator operation amount θacc is performed from a value having a small accelerator operation amount θacc. And/or when the accelerator returning operation made from the accelerator operation amount θacc having the same value is to a value with the current accelerator operation amount θaccr being smaller, the torque reduction rate Rdt is set to a larger value than when the current accelerator operation amount θaccr is to a larger value. Accordingly, when the reference opening degree difference Δθaccb is relatively large, the torque reduction rate Rdt is appropriately set to a relatively large value. On the other hand, when the reference opening degree difference Δθaccb is relatively small, the torque reduction rate Rdt is appropriately set to a relatively small value.

Although the examples of the present disclosure have been described in detail with reference to the drawings, the present disclosure also applies to other modes.

For example, in the above-described embodiment, BEV of the front and rear wheel independent drive type is exemplified as the vehicles 10, but the present disclosure is not limited to this embodiment. For example, the vehicles 10 may be electrified vehicle such as known HEV (Hybrid Electric Vehicle), known PHEV (Plug-in Hybrid Electric Vehicle), known FCEV (Fuel Cell Electric Vehicle). The vehicle 10 may be a known engine vehicle. Alternatively, the vehicle 10 may be a known AWD vehicle in which power is distributed to front and rear wheels by transfer or the like, or may be a known 2WD vehicle. In short, the present disclosure can be applied to a vehicle including a power source and a power transmission device that transmits power from the power source to drive wheels.

It should be noted that the embodiment described above is merely one embodiment, and the present disclosure can be implemented in a mode in which various changes and improvements are made based on the knowledge of those skilled in the art.

What is claimed is:

1. A control device for a vehicle that is equipped with a power source and a power transmission device for transmitting power from the power source to a drive wheel, the control device comprising a drive control unit that, the greater an amount of change in an accelerator operation amount from a point in time at which an accelerator returning operation was performed to a current point in time is, sets a reduction rate of driving torque to a greater value, when reducing the driving torque toward a requested value of the driving torque based on a current value of the accelerator operation amount, wherein the accelerator returning operation is an operation in which an accelerator operation state changes from an increased state to a reduced state, and the drive control unit includes an accelerator operation state determination unit for determining whether the accelerator returning operation has been performed, a reference operation amount setting unit for setting the accelerator operation amount, at the point in time at which the accelerator returning operation is performed, as a reference operation amount, and a torque reduction rate setting unit that sets the reduction rate of the driving torque to a greater value the greater a difference between the reference operation amount and the current value of the accelerator operation amount is.

2. The control device according to claim 1, wherein the torque reduction rate setting unit sets the reduction rate of the driving torque to a greater value when the reference operation amount is a greater value with respect to a current value of the accelerator operation amount, as compared to when the reference operation amount is a smaller value.

3. The control device according to claim 1, wherein the torque reduction rate setting unit sets the reduction rate of the driving torque to a greater value when a current value of the accelerator operation amount is a smaller value with respect to the reference operation amount, as compared to when a current value of the accelerator operation amount is a greater value.

* * * * *